(12) United States Patent  (10) Patent No.: US 8,727,381 B2
Hirukawa  (45) Date of Patent: May 20, 2014

(54) FUEL TANK ASSEMBLY

(75) Inventor: Masayuki Hirukawa, Dublin, OH (US)

(73) Assignee: Honda Motor Co., Ltd. (JP)

(*) Notice: Subject to any disclaimer, the term of this patent is extended or adjusted under 35 U.S.C. 154(b) by 85 days.

(21) Appl. No.: 13/523,133

(22) Filed: Jun. 14, 2012

(65) Prior Publication Data
US 2013/0334804 A1 Dec. 19, 2013

(51) Int. Cl.
B62J 35/00 (2006.01)

(52) U.S. Cl.
CPC .................................... B62J 35/00 (2013.01)
USPC ........................................ 280/835; 220/562

(58) Field of Classification Search
CPC ..................................................... B62J 35/00
USPC .......... 280/833, 834, 835; 220/562, 563, 564, 220/4.14; 16/374, 380
See application file for complete search history.

(56) References Cited

U.S. PATENT DOCUMENTS

| | | | |
|---|---|---|---|
| 1,347,051 A | 7/1920 | Neuteboom | |
| 4,347,909 A | 9/1982 | Takemura et al. | |
| 4,449,723 A * | 5/1984 | Shiratsuchi | 280/833 |
| 4,469,190 A | 9/1984 | Yamaguchi | |
| 6,641,169 B2 | 11/2003 | Fukunaga et al. | |
| 6,896,293 B2 * | 5/2005 | Philipps et al. | 280/833 |
| 7,681,682 B2 * | 3/2010 | Miyashiro | 180/219 |
| 7,992,901 B2 * | 8/2011 | Hirano et al. | 280/833 |
| 8,038,172 B2 * | 10/2011 | Morikawa | 280/833 |
| 2009/0166364 A1 * | 7/2009 | Shimomura | 220/562 |

FOREIGN PATENT DOCUMENTS

JP 05008780 A * 1/1993 ............... B62J 35/00

* cited by examiner

Primary Examiner — Paul N Dickson
Assistant Examiner — Wesley Potter
(74) Attorney, Agent, or Firm — Ulmer & Berne LLP

(57) ABSTRACT

A fuel tank assembly includes a hinge assembly, a fuel tank, and at least one hinge bolt. The hinge assembly includes a hinge pin and a hinge stay. The hinge pin pivotally couples the hinge stay to a vehicular frame and defines a hinge axis about which the hinge stay is pivotable with respect to a frame. The at least one hinge bolt releasably couples the hinge stay to the fuel tank such that the fuel tank is pivotable about the hinge axis. The at least one hinge bolt intersects the hinge axis and obstructs the hinge pin from being removed from the hinge stay.

20 Claims, 7 Drawing Sheets

US 8,727,381 B2

FUEL TANK ASSEMBLY

TECHNICAL FIELD

A fuel tank assembly includes a fuel tank pivotally coupled to a frame by a hinge assembly.

BACKGROUND

Many conventional vehicles, such as saddle-type vehicles, include a fuel tank which is positioned upon the vehicle to attain optimal performance and styling, and when possible, configured for movement to facilitate accessibility to an underlying area beneath the fuel tank.

SUMMARY

In accordance with one embodiment, a fuel tank assembly comprises a hinge assembly, a fuel tank, and at least one hinge bolt. The hinge assembly comprises a hinge pin and a hinge stay. The hinge pin pivotally couples the hinge stay to a vehicular frame and defines a hinge axis about which the hinge stay is pivotable. The fuel tank includes a front end and a rear end. The at least one hinge bolt releasably couples the hinge stay to the fuel tank such that the fuel tank is pivotable about the hinge axis. The at least one hinge bolt intersects the hinge axis and obstructs the hinge pin from being removed from the hinge stay.

In accordance with another embodiment, a vehicle comprises a frame, a hinge assembly, a fuel tank, and at least one hinge bolt. The hinge assembly comprises a hinge pin and a hinge stay. The hinge pin pivotally couples the hinge stay to the frame and defines a hinge axis about which the hinge stay is pivotable with respect to the frame. The fuel tank includes a front end and a rear end. The at least one hinge bolt releasably couples the hinge stay to the fuel tank such that the fuel tank is pivotable with respect to the frame about the hinge axis. The at least one hinge bolt intersects the hinge axis and obstructs the hinge pin from being removed from the hinge stay.

In accordance with yet another embodiment, a saddle-type vehicle comprises a frame, at least two wheels, a hinge assembly, a fuel tank, a first hinge bolt, and a second hinge bolt. The at least two wheels are rotatably coupled to the frame. The hinge assembly comprises a hinge pin and a hinge stay. The hinge pin pivotally couples the hinge stay to the frame and includes a first end and a second end. The hinge pin defines a hinge axis about which the hinge stay is pivotable with respect to the frame. The fuel tank includes a front end and a rear end. The first and second hinge bolts releasably couple the hinge stay to the front end of the fuel tank such that the fuel tank is pivotable about the hinge axis. A substantially vertical imaginary plane extends between the front end and the rear end of the fuel tank and is substantially perpendicular to the hinge axis. The substantially vertical imaginary plane intersects the hinge stay to define left and right sides of the hinge stay. The first and second hinge bolts are disposed on opposite sides of the imaginary plane. The first hinge bolt intersects the hinge axis. The first end of the hinge pin is provided with at least one of a cotter pin and a circlip.

BRIEF DESCRIPTION OF THE DRAWINGS

It is believed that certain embodiments will be better understood from the following description taken in conjunction with the accompanying drawings in which.

DETAILED DESCRIPTION

Figure 1:
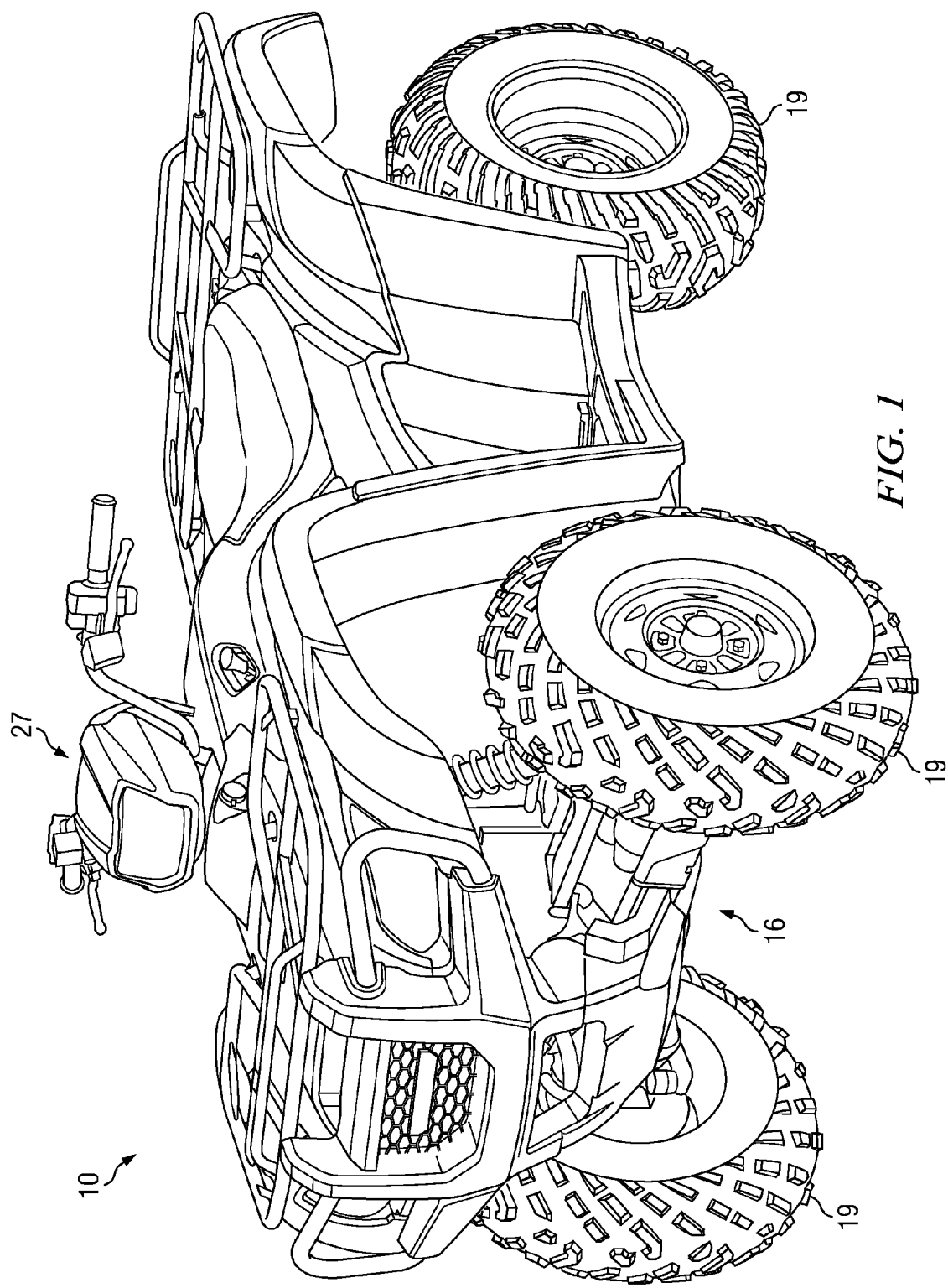
FIG. 1 is a front perspective view of a vehicle, according to one embodiment.

Embodiments are hereinafter described in detail in connection with the views and examples of FIGS. 1-7, wherein like numbers indicate the same or corresponding elements throughout the views. A vehicle, such as vehicle 10 depicted in FIG. 1, can include a pivotable fuel tank pivotally mounted to a frame. The vehicle 10 is depicted in FIG. 1 to be an all-terrain vehicle ("ATV"). However, any of a variety of vehicles can be provided having a pivotable fuel tank mounted to a frame. For example, a vehicle can include any of a variety of saddle-type vehicles, such as a motorcycle, or any of a variety of non-saddle type vehicles, such as, for example, an automobile, a truck, a van, a scooter, a recreational vehicle, a watercraft, an aircraft, agricultural equipment, construction equipment, a toy, or a mower.

Figure 2:
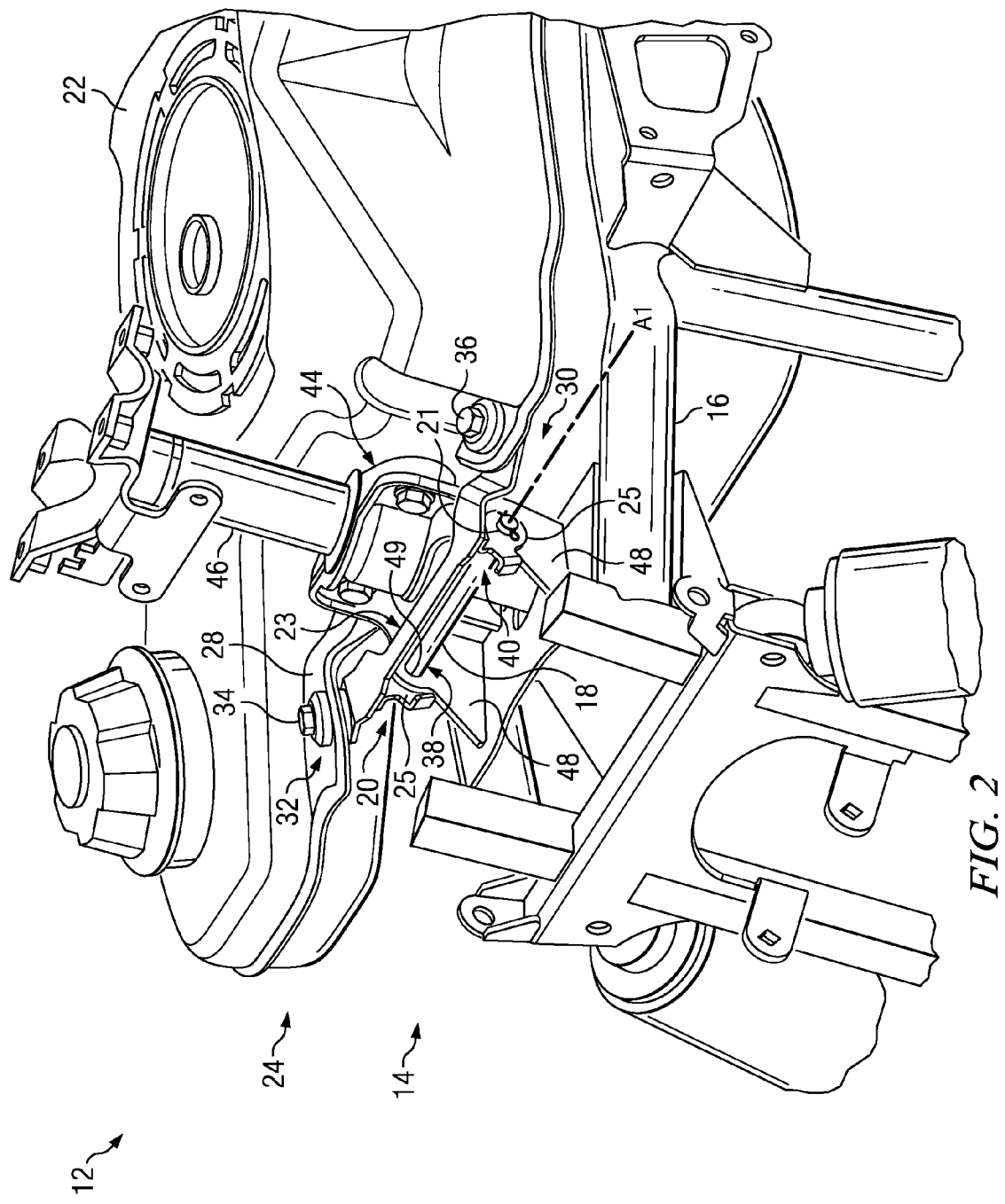
FIG. 2 is an enlarged front perspective view depicting a fuel tank assembly of the vehicle of FIG. 1, wherein the fuel tank assembly includes a hinge assembly having first and second hinge bolts, a flange, a hinge stay, and a hinge pin.

As illustrated in FIG. 1, the vehicle 10 can include a frame 16 that supports an engine (not shown) and rotatably supports a plurality of wheels (e.g,. 19). As illustrated in FIG. 2, a fuel tank assembly 12 can be supported upon the frame 16. The fuel tank assembly 12 is shown to include a fuel tank 22 that is pivotally coupled to the frame 16 by a hinge assembly 14. The hinge assembly 14 can include a hinge pin 18 and a hinge stay 20. As illustrated in FIG. 2, the hinge stay 20 can include an elongated central portion 23 and a pair of end portions 25. Each of the end portions 25 can extend generally downwardly from the elongated central portion 23 such that the end portions 25 are substantially perpendicular to the elongated central portion 23. Each of the end portions 25 can define a hinge stay aperture (e.g., 21) that is configured to receive the hinge pin 18.

The frame 16 can include a head tube 44 having a pair of upright members 48. The hinge pin 18 can pass through each of the upright members 48 and the end portions 25 to facilitate pivotal coupling of the hinge stay 20 with respect to the frame 16. Each of the upright members 48 can define a frame aperture (e.g., 49) that is configured to accommodate receipt of the hinge pin 18. The frame apertures (e.g., 49) can be substantially aligned with the hinge stay apertures (e.g., 21) to facilitate receipt of the hinge pin 18. The hinge pin 18 can define a hinge axis A1 and the hinge stay 20 can be pivotable with respect to the frame 16 about the hinge axis A1.

While FIG. 2 depicts the upright members 48 of the head tube 44 positioned between the end portions 25 of the hinge stay 20, it will be appreciated that a hinge stay can be pivotally coupled to a frame in any of a variety of suitable alternative arrangements such as, for example, a hinge stay being positioned between upright portions of a head tube. It will also be appreciated that a hinge stay and frame can be provided in any of a variety of suitable alternative arrangements for pivotally supporting a fuel tank.

In addition to being coupled to the frame 16, the hinge stay 20 can be coupled to the fuel tank 22 such that the fuel tank 22 is pivotable with respect to the frame 16 about the hinge axis A1. As illustrated in FIG. 2, first and second hinge bolts 34, 36 can facilitate releasable coupling of the hinge stay 20 to the fuel tank 22. The first and second hinge bolts 34, 36 can be threadedly engaged with respective nuts (e.g., 50 in FIGS. 4 and 5). In one embodiment, the nuts 50 can comprise weld nuts. It will be appreciated that a hinge stay can be secured to the fuel tank with any of a variety of fasteners and/or attachment arrangements.

Figure 3:
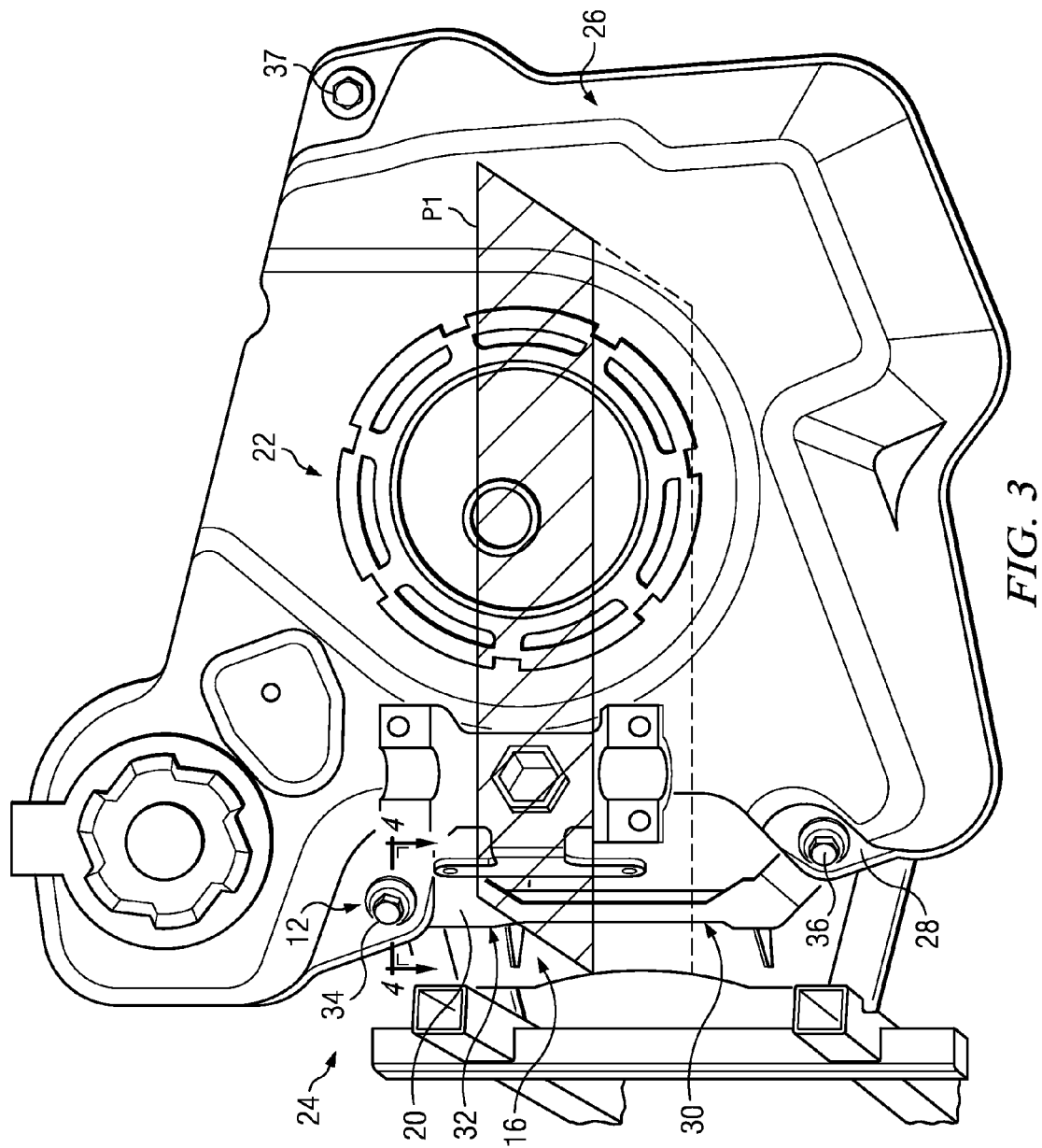
FIG. 3 is an upper perspective view depicting the fuel tank assembly of FIG. 2.
Figure 4:
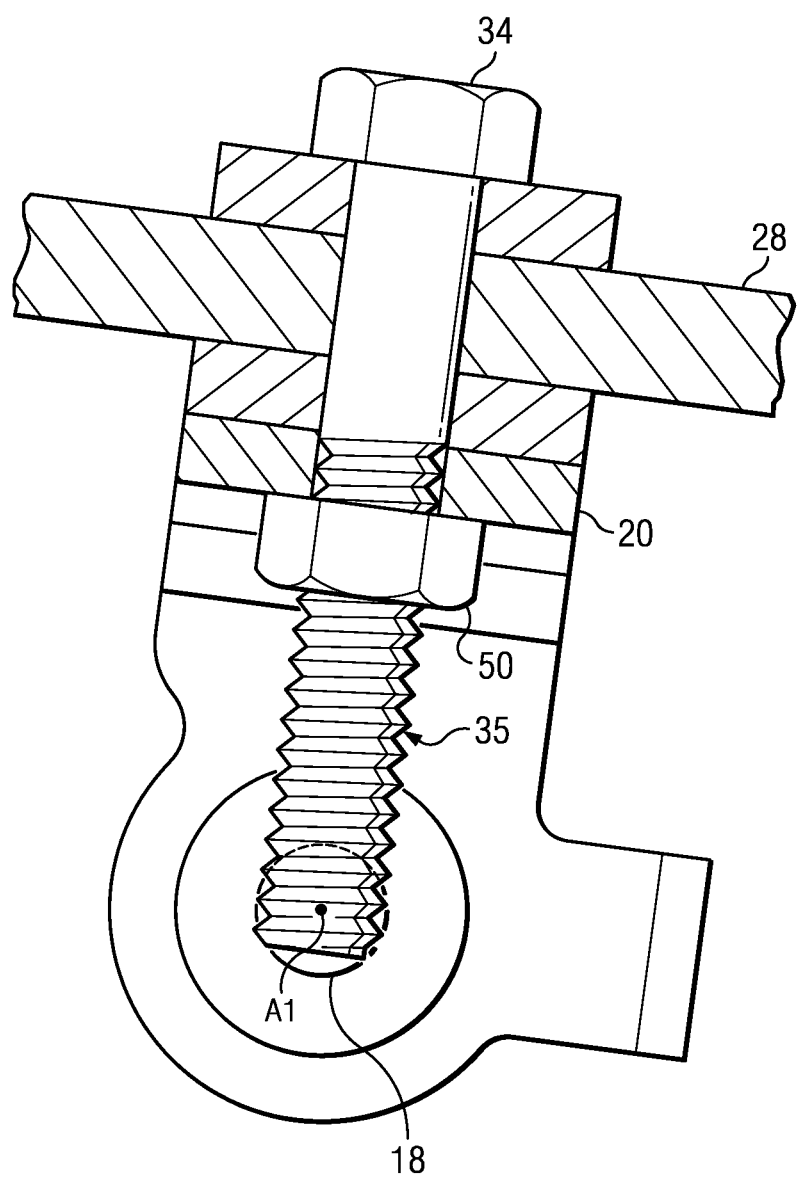
FIG. 4 is a cross-sectional view taken along the line 4-4 in FIG. 3 and depicting the first hinge bolt intersecting a hinge axis defined by the hinge pin.

The fuel tank 22 can include a front end 24 and a rear end 26. In one embodiment, as illustrated in FIGS. 2-4, the front end 24 of the fuel tank 22 can comprise a flange 28 which can be configured to receive the first and second hinge bolts 34, 36. In such an embodiment, the first and second hinge bolts 34, 36 can extend through the flange 28. While the fuel tank 22 in the embodiment of FIGS. 2-5 is shown to include the flange 28, it will be appreciated that any of a variety of other suitable fuel tank configurations can be provided that accept receipt of a fastener or other fastening arrangements for securing the hinge stay 20 to the fuel tank 22.

In the embodiment of FIGS. 2-3, the hinge stay 20 can be coupled to the front end 24 of the fuel tank 22 such that an area beneath the fuel tank 22 can be accessed from the rear end 26 of the fuel tank 22. As illustrated in FIG. 3, a rear bolt 37 can releasably secure the rear end 26 of the fuel tank 22 to the frame 16 and thus prevent the fuel tank 22 from pivoting about the hinge axis A1. The rear bolt 37 can be selectively removed to permit the pivoting of the fuel tank 22 away from the frame 16. It will be appreciated that the hinge assembly 14 can be arranged anywhere on the tank 22 so as to permit pivoting of the fuel tank 22 in a particular direction (e.g., leftwardly or rightwardly). It will also be appreciated that a fuel tank can be coupled to another portion of a frame or other portion of a vehicle by a hinge assembly. In particular, while FIG. 2 shows the frame apertures 49 to be defined by portions of the head tube 44, it will be appreciated that one or more frame apertures can be positioned on other portions of a frame in any of a variety of other suitable configurations.

As illustrated in FIG. 2, the head tube 44 can pivotally support a steering shaft 46 that is coupled to a pair of handlebars (27 in FIG. 1). The hinge stay 20 and the fuel tank 22 can define a gap through which the head tube 44 and the steering shaft 46 can pass. As illustrated in FIG. 3, an imaginary plane P1 can extend between the front end 24 and the rear end 26 of the fuel tank 22. The imaginary plane P1 can be a substantially vertical plane that is substantially perpendicular to the hinge axis A1. The imaginary plane P1 can intersect (e.g., bisect) the hinge stay 20 to define left and right sides 30, 32 of the hinge stay 20. The first and second hinge bolts 34, 36 can be disposed entirely on opposite sides of the hinge stay 20. In some embodiments, the hinge stay 20 can be releasably secured to the fuel tank 22 with less than or more than two bolts.

Figure 5:
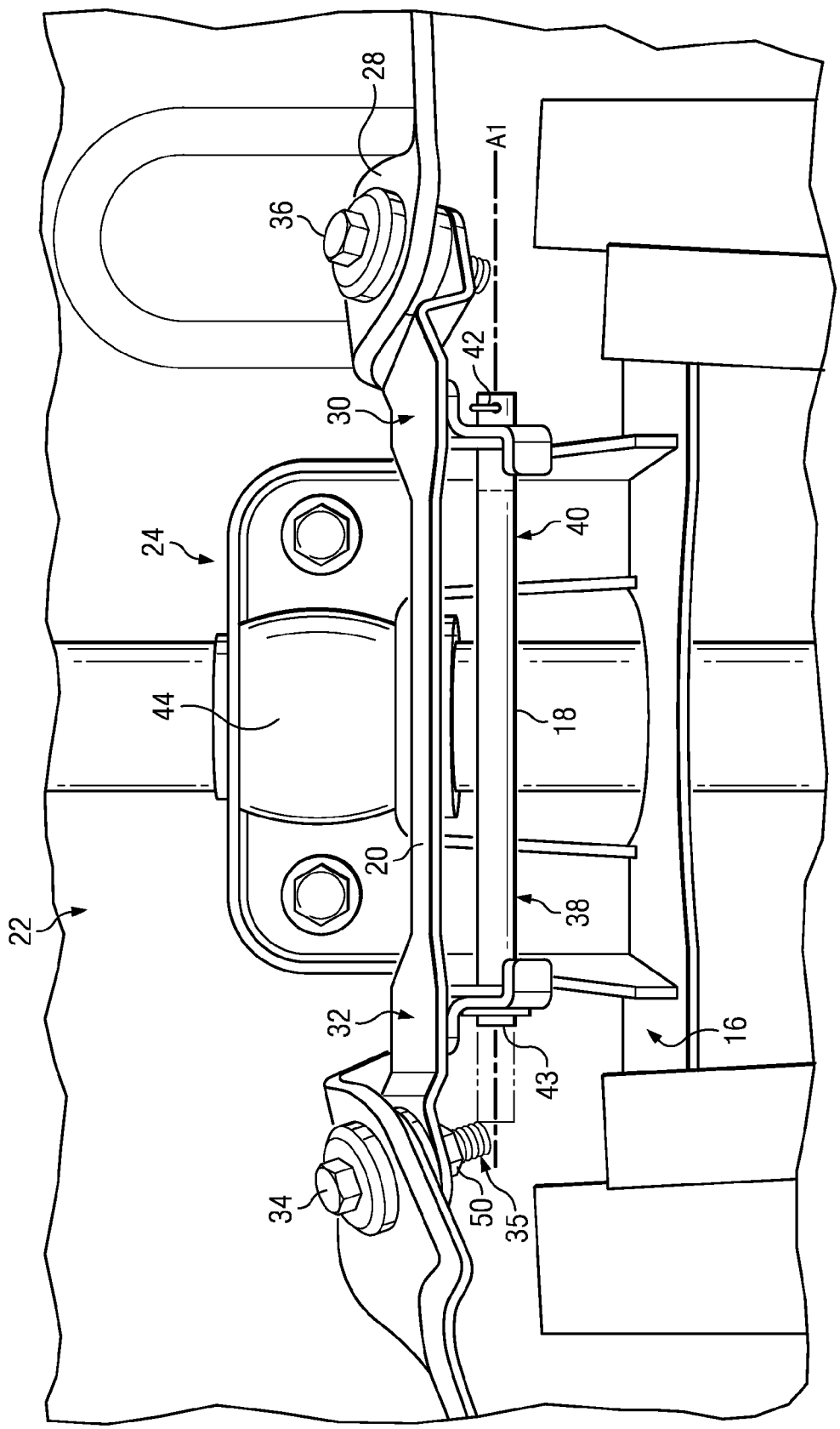
FIG. 5 is an enlarged front view depicting the fuel tank assembly of FIG. 2 with the hinge pin shown in solid lines in an installed position and shown in dashed lines in a partially removed position.

When the first and second hinge bolts 34, 36 are installed to facilitate coupling of the hinge stay 20 to the fuel tank 22, a threaded portion 35 of the first hinge bolt 34 can extend far enough beyond the flange 28 to intersect the hinge axis A1, as illustrated in FIGS. 4-5. As illustrated in FIG. 5, when the hinge pin 18 is slid rightwardly (as shown in dashed lines), the hinge pin 18 can contact the threaded portion 35 of the first hinge bolt 34 thereby obstructing the hinge pin 18 and preventing its removal from the hinge stay 20.

The hinge pin 18 can comprise a first end 38 and a second end 40, as illustrated in FIGS. 2 and 5. A cotter pin 42 can be releasably coupled to the second end 40 of the hinge pin 18 and can prevent the second end 40 of the hinge pin 18 from sliding into the hinge stay 20. The cotter pin 42 can be selectively removed to permit the hinge pin 18 to be slid rightwardly with respect to the hinge stay 20 and the frame 16. The first end 38 of the hinge pin 18 can include a stop portion 43 that prevents the first end 38 from sliding into the hinge stay 20. The stop portion 43 can encourage one-way removal of the hinge pin 18 from the right side 32 of the hinge stay 20 by preventing the hinge pin 18 from being removed by sliding leftwardly. The stop portion 43 can have a greater diameter than that of the frame apertures 49 and/or the hinge stay apertures 21. In one embodiment, as illustrated FIG. 5, the stop portion 43 can be a washer that is affixed to the first end 38 of the hinge pin 20 (e.g., through welding). In another embodiment, the stop portion 43 can be a bulbous end formed integrally with the first end 38 of the hinge pin 18 (e.g., in a one-piece construction). In other embodiments, a stop portion can comprise any of a variety of arrangements affixed or otherwise formed on the hinge pin 18 that prevents the hinge pin 18 from sliding into a hinge stay in a particular direction.

Since the stop portion 43 prevents leftward removal of the hinge pin 18 from the hinge stay 20, the second hinge bolt 36 might not need to intersect the hinge axis A1 to obstruct the hinge pin 18. Therefore, the hinge assembly 14 and the fuel tank 22 can be arranged such that the second hinge bolt 36 is offset from the hinge axis A1, as illustrated in FIG. 3, and thus not positioned to obstruct the hinge pin 18. While the embodiment of FIGS. 2-5 depicts the hinge pin 18 to be configured such that it is obstructed on the right side 32 by the first hinge bolt 34, it will be appreciated that a hinge pin and/or hinge bolts can be configured to facilitate removal and obstruction of the hinge pin in any of a variety of other suitable configurations.

The hinge pin 18 accordingly cannot be removed from the hinge stay 20 without first removing the first hinge bolt 34. Any attempts to remove the fuel tank 22 from the vehicle 10 by simply removing the hinge pin 18 are therefore discouraged. Instead, the fuel tank 22 must be removed from the vehicle 20 by first removing the first hinge bolt 34. This can encourage proper disassembly of the fuel tank 22 which can reduce the risk of the fuel tank 22 being inadvertently damaged during disassembly and can additionally discourage inexperienced users from removing the fuel tank. Additionally, the first hinge bolt 34 can prevent the hinge pin 18 from being inadvertently separated from the hinge stay 20 such as when the cotter pin 42 is not installed properly.

It will be appreciated that a fuel hose (not shown) can be connected at one end to the fuel tank 22 and can be routed underneath the fuel tank 22 and near the hinge stay 20. Removing the fuel tank 22, rather than pivoting it upwardly, might result in kinking or could cause other damage to the fuel hose. By restricting removal of the hinge pin 18 from the hinge stay 20 with at least one of the hinge bolts (e.g., 34) and thus requiring detachment of the fuel tank 22 from the hinge stay 20, removal of the fuel tank 22 can be discouraged, or at a minimum, proper precaution and greater care can be encouraged to prevent damage to the fuel hose.

Figure 6:
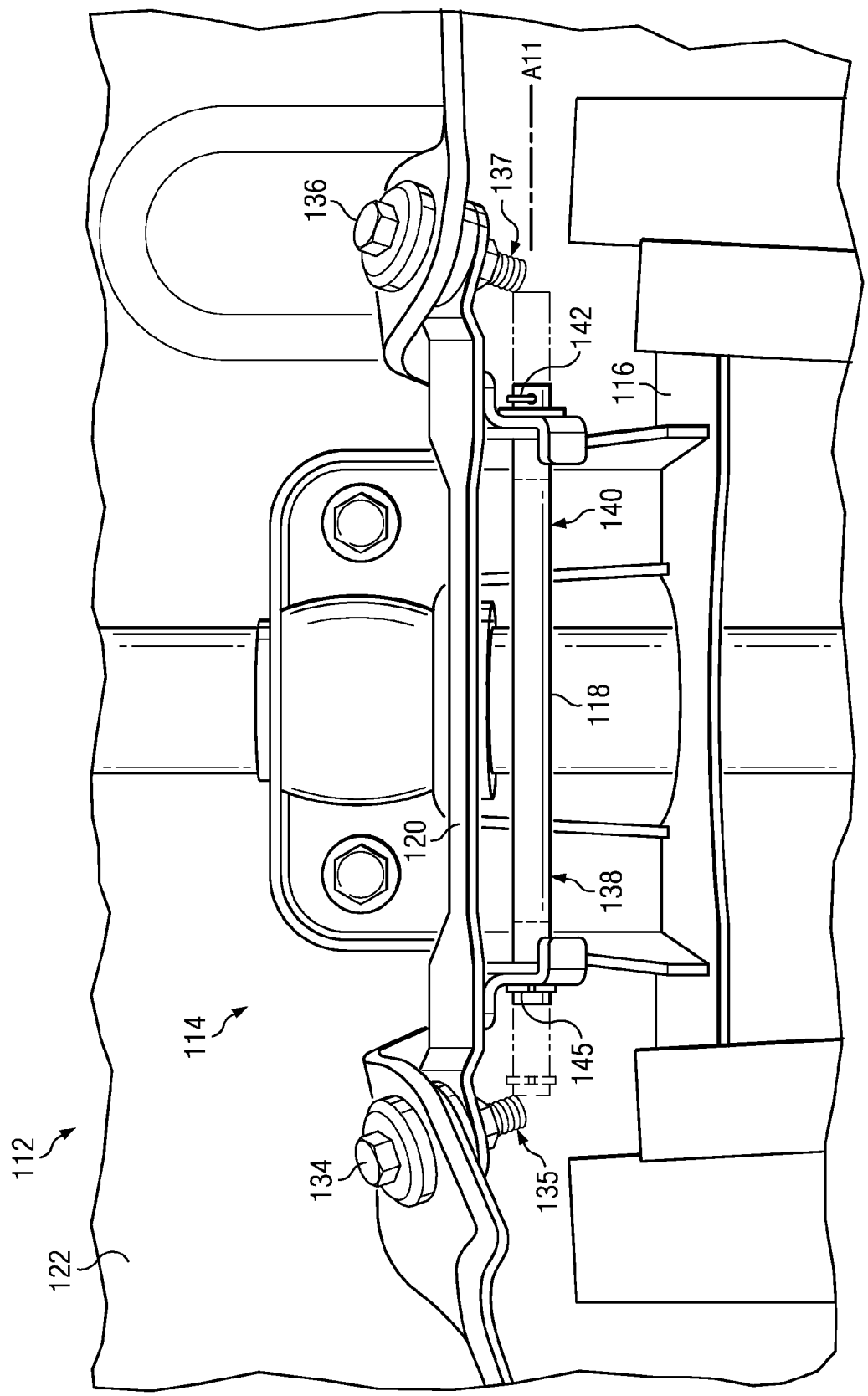
FIG. 6 is a front view depicting a fuel tank assembly according to another embodiment, wherein the fuel tank assembly includes a hinge assembly and a hinge pin, and the hinge pin is shown in solid lines in an installed position and is shown in dashed lines in a partially removed leftward position and a partially removed rightward position.

Referring now to FIG. 6, a fuel tank assembly 112 is illustrated according to another embodiment. The fuel tank assembly 112 can be similar to, or the same in many respects to the fuel tank assembly 12 shown in FIGS. 1-5. For example, the fuel tank assembly 112 can include a hinge assembly 114 and a fuel tank 122. The fuel tank 122 can be pivotally coupled to a frame 116 by the hinge assembly 114. The hinge assembly 114 can include a hinge pin 118 and a hinge stay 120. The hinge stay 120 can be releasably coupled to the fuel tank 122 by first and second hinge bolts 134, 136. The hinge pin 118 can include first and second ends 138, 140 and can define a hinge axis A11. The second end 140 of the hinge pin 118 can be provided with a cotter pin 142 that prevents the second end 140. The first end 138 of the hinge pin 118, however, can be provided with a circlip 145. When the circlip 145 is installed on the first end 138 of the hinge pin 118, the first end 138 is prevented from sliding into the hinge stay 120. Once the circlip 145 is removed, however, the second end 140 of the hinge pin 118 is permitted to slide into the hinge stay 120 thus permitting removal of the hinge pin 118 from a left side 130 of the hinge stay 120. The cotter pin 142 and the circlip 145 accordingly cooperate to permit removal of the hinge pin 118 from the hinge stay 120 in either direction.

Figure 7:
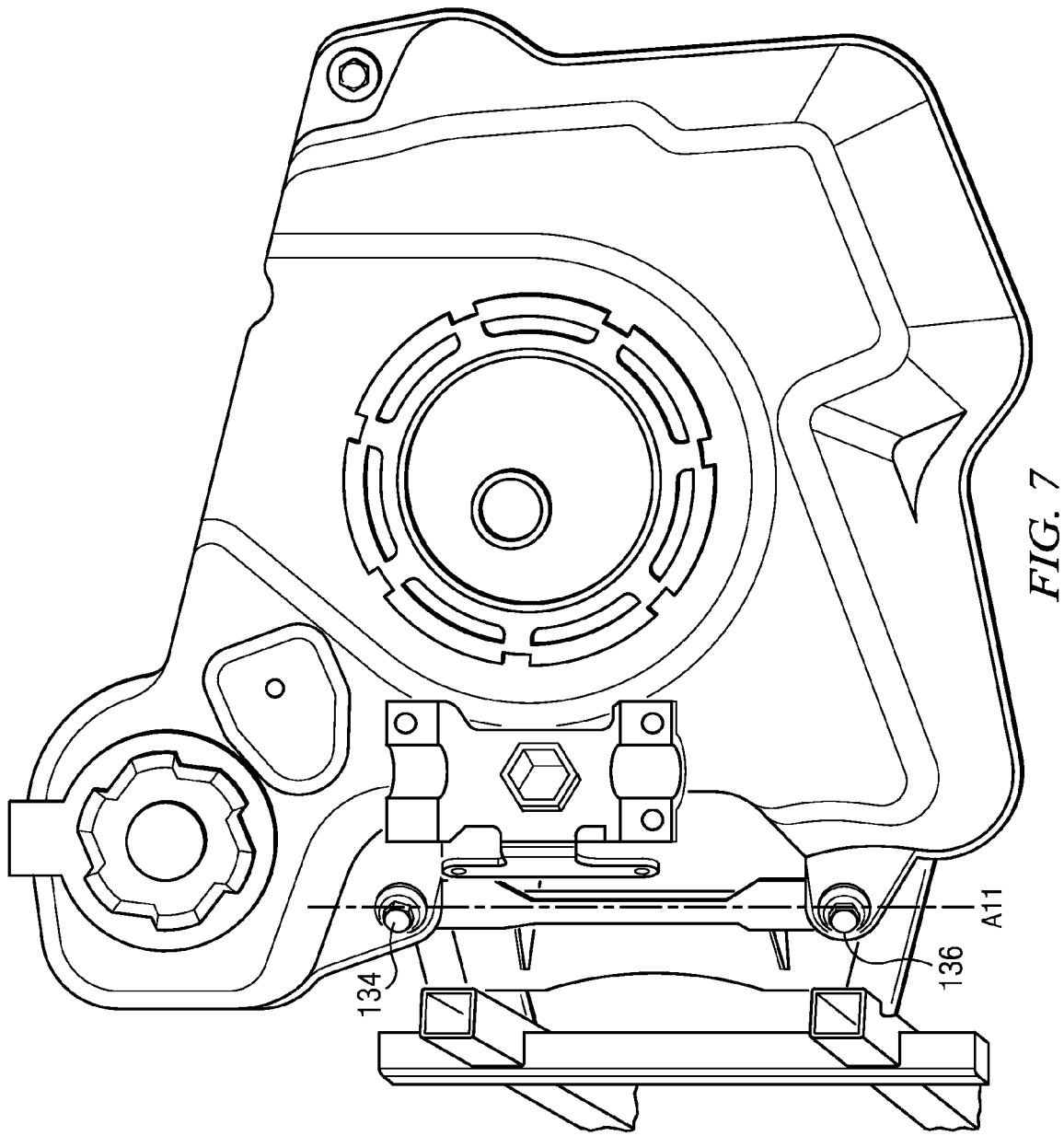
FIG. 7 is a top perspective view depicting the fuel tank assembly of FIG. 6.

As illustrated in FIG. 6, when the first and second hinge bolts 134, 136 are installed, respective threaded portions 135, 137 of the first and second hinge bolts 134, 136 can extend far enough to intersect the hinge axis A11. The first and second hinge bolts 134, 136 can accordingly obstruct the hinge pin 118 from being removed from either side. At least one of the first and second hinge bolts 134, 136 must therefore be removed before trying to remove the hinge pin 118 from the hinge stay 120. As illustrated in FIG. 7, the hinge assembly 114 and the fuel tank 122 can be arranged such that the first and second hinge bolts 134, 136 are substantially aligned with the hinge axis A11 and thus positioned to obstruct the hinge pin 118 on both sides.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A fuel tank assembly comprising:
a hinge assembly comprising a hinge pin and a hinge stay, the hinge pin pivotally coupling the hinge stay to a vehicular frame and defining a hinge axis about which the hinge stay is pivotable;
a fuel tank having a front end and a rear end; and
at least one hinge bolt that releasably couples the hinge stay to the fuel tank such that the fuel tank is pivotable about the hinge axis;
wherein said at least one hinge bolt intersects the hinge axis and obstructs the hinge pin from being removed from the hinge stay.

2. The fuel tank assembly of claim 1 wherein the front end of the fuel tank includes a flange and said at least one hinge bolt extends through the flange to releasably couple the hinge stay to the front end of the fuel tank.

3. The fuel tank assembly of claim 2 wherein a substantially vertical imaginary plane extends between the front end and the rear end of the fuel tank, the substantially vertical imaginary plane is substantially perpendicular to the hinge axis, the substantially vertical imaginary plane intersects the hinge stay to define left and right sides of the hinge stay, and said at least one hinge bolt is disposed entirely on one of the left and right sides.

4. The fuel tank assembly of claim 3 wherein:
said at least one hinge bolt a comprises a first hinge bolt;
the fuel tank assembly further comprises a second bolt; and
the first and second hinge bolts are disposed on opposite sides of the substantially vertical imaginary plane.

5. The fuel tank assembly of claim 4 wherein each of the first hinge bolt and the second hinge bolt extends through the flange and releasably couples the hinge stay to the flange.

6. The fuel tank assembly of claim 4 wherein the first hinge bolt intersects the hinge axis but the second hinge bolt does not intersect the hinge axis.

7. The fuel tank assembly of claim 6 wherein the hinge pin includes a first end and a second end, and the first end is provided with one of a cotter pin and a circlip.

8. The fuel tank assembly of claim 7 wherein the second end of the hinge pin is provided with one of a cotter pin and a circlip.

9. The fuel tank assembly of claim 7 wherein the second end of the hinge pin includes a stop portion that is configured to prevent the second end from sliding into the hinge stay.

10. A vehicle comprising:
a frame;
a hinge assembly comprising a hinge pin and a hinge stay, the hinge pin pivotally coupling the hinge stay to the frame and defining a hinge axis about which the hinge stay is pivotable with respect to the frame; and
a fuel tank having a front end and a rear end; and
at least one hinge bolt that releasably couples the hinge stay to the fuel tank such that the fuel tank is pivotable with respect to the frame about the hinge axis;
wherein said at least one hinge bolt intersects the hinge axis and obstructs the hinge pin from being removed from the hinge stay.

11. The vehicle of claim 10 wherein the vehicle is an all-terrain vehicle.

12. The vehicle of claim 10 wherein the frame further comprises a head tube, and the hinge stay and the fuel tank define a gap through which the head tube passes.

13. The vehicle of claim 10 wherein the front end of the fuel tank includes a flange and said at least one hinge bolt extends through the flange to releasably couple the hinge stay to the front end of the fuel tank.

14. The vehicle of claim 13 wherein a substantially vertical imaginary plane extends between the front end and the rear end of the fuel tank, the substantially vertical imaginary plane is substantially perpendicular to the hinge axis, the substantially vertical imaginary plane intersects the hinge stay to define left and right sides of the hinge stay, and said at least one hinge bolt is disposed entirely on one of the left and right sides.

15. The vehicle of claim 14 wherein:
said at least one hinge bolt comprises a first hinge bolt;
the fuel tank assembly further comprises a second hinge bolt; and
the first and second hinge bolts are disposed on opposite sides of the substantially vertical imaginary plane.

16. The vehicle of claim 15 wherein the first hinge bolt intersects the hinge axis but the second hinge bolt does not intersect the hinge axis.

17. The vehicle of claim 16 wherein the hinge pin includes a first end and a second end, and the first end is provided with one of a cotter pin and a circlip.

18. The vehicle of claim 17 wherein the second end of the hinge pin includes a stop portion that is configured to prevent the second end from sliding into the hinge stay.

19. An all-terrain vehicle comprising:
a frame;
at least two wheels rotatably coupled to the frame;
a hinge assembly comprising a hinge pin and a hinge stay, the hinge pin pivotally coupling the hinge stay to the frame and having a first end and a second end, the hinge pin defining a hinge axis about which the hinge stay is pivotable with respect to the frame;
a fuel tank having a front end and a rear end; and
a first hinge bolt and a second hinge bolt, the first and second hinge bolts releasably coupling the hinge stay to the front end of the fuel tank such that the fuel tank is pivotable about the hinge axis; wherein:
a substantially vertical imaginary plane extends between the front end and the rear end of the fuel tank and is substantially perpendicular to the hinge axis;
the substantially vertical imaginary plane intersects the hinge stay to define left and right sides of the hinge stay;
the first and second hinge bolts are disposed on opposite sides of the imaginary plane;
the first hinge bolt intersects the hinge axis; and
the first end of the hinge pin is provided with at least one of a cotter pin and a circlip.

20. The all-terrain vehicle of claim 19 wherein the second end of the hinge pin includes a stop portion that is configured to prevent the second end from sliding into the hinge stay.

* * * * *

UNITED STATES PATENT AND TRADEMARK OFFICE
CERTIFICATE OF CORRECTION

| | |
|---|---|
| PATENT NO. | : 8,727,381 B2 |
| APPLICATION NO. | : 13/523133 |
| DATED | : May 20, 2014 |
| INVENTOR(S) | : Masayuki Hirukawa |

It is certified that error appears in the above-identified patent and that said Letters Patent is hereby corrected as shown below:

In the Claims:

Claim 4, column 6, line 12, change "bolt a comprises" to --bolt comprises--; and
Claim 4, column 6, line 13, change "second bolt" to --second hinge bolt--.

Signed and Sealed this
Twelfth Day of August, 2014

Michelle K. Lee
*Deputy Director of the United States Patent and Trademark Office*